US012296717B2

(12) United States Patent
Cronin (10) Patent No.: US 12,296,717 B2
(45) Date of Patent: May 13, 2025

(54) INTELLIGENT HYBRID POWER SYSTEM FOR ELECTRICAL VEHICLES

(71) Applicant: SUSTAINABLE ENERGY TECHNOLOGIES, INC., Wilmington, DE (US)

(72) Inventor: John Cronin, Wilmington, DE (US)

(73) Assignee: Sustainable Energy Technologies, Inc., Wilmington, DE (US)

( * ) Notice: Subject to any disclaimer, the term of this patent is extended or adjusted under 35 U.S.C. 154(b) by 0 days.

(21) Appl. No.: 18/082,425

(22) Filed: Dec. 15, 2022

(65) Prior Publication Data

US 2023/0191949 A1    Jun. 22, 2023

Related U.S. Application Data

(60) Provisional application No. 63/290,703, filed on Dec. 17, 2021.

(51) Int. Cl.
*B60L 58/22* (2019.01)

(52) U.S. Cl.
CPC ......... *B60L 58/22* (2019.02); *B60L 2240/549* (2013.01); *B60L 2240/60* (2013.01)

(58) Field of Classification Search
CPC . B60L 58/22; B60L 2240/549; B60L 2240/60
See application file for complete search history.

(56) References Cited

U.S. PATENT DOCUMENTS 5,642,270 A    6/1997 Green et al.
6,068,078 A    5/2000 Rau et al.
(Continued)

FOREIGN PATENT DOCUMENTS

CN    103192724    7/2013
CN    104057901    9/2014
(Continued)

OTHER PUBLICATIONS

PCT Application No. PCT/US2022/053060 International Search Report and Written Opinion dated Apr. 4, 2023 (15 Pages).
(Continued)

*Primary Examiner* — Jared Fureman
*Assistant Examiner* — Duc M Pham
(74) *Attorney, Agent, or Firm* — Polsinelli LLP (57) ABSTRACT

A system for powering an electric vehicle includes at least one electrochemical battery, at least one supercapacitor battery, a first relay disposed on a first electrical path between the at least one electrochemical battery and the electric vehicle, the first relay to connect or disconnect the at least one electrochemical battery to or from the electric vehicle, and a second relay disposed on a second electrical path between the at least one supercapacitor battery and the electric vehicle, the second relay to connect or disconnect the at least one supercapacitor battery to or from the electric vehicle. The system also includes a processor communicatively coupled to first and second relays, wherein the processor, responsive to a first condition, disconnects the at least one electrochemical battery from the electric vehicle via the first relay and connects the at least one supercapacitor battery to the electric vehicle via the second relay.

18 Claims, 4 Drawing Sheets

(56) References Cited

U.S. PATENT DOCUMENTS

| | | |
|---|---|---|
| 7,548,894 B2 | 6/2009 | Fuji |
| 8,080,971 B2 | 12/2011 | Bose et al. |
| 8,881,832 B2 | 11/2014 | McMillon et al. |
| 8,950,662 B2 | 2/2015 | Soborski |
| 9,053,870 B2 | 6/2015 | Yu et al. |
| 9,145,760 B2 | 9/2015 | McMillon et al. |
| 9,169,719 B2 | 10/2015 | McMillon et al. |
| 9,233,860 B2 | 1/2016 | Liu et al. |
| 9,298,239 B2 | 3/2016 | Ishii et al. |
| 9,318,271 B2 | 4/2016 | Fletcher et al. |
| 9,379,546 B2 | 6/2016 | Li |
| 9,519,942 B2 | 12/2016 | Soborski |
| 9,940,572 B2 | 4/2018 | Soborski |
| 10,061,958 B2 | 8/2018 | Voigt et al. |
| 10,173,663 B1 | 1/2019 | Combs |
| 10,235,597 B2 | 3/2019 | Voigt et al. |
| 10,380,601 B2 | 8/2019 | Soborski |
| 10,700,597 B1 | 6/2020 | Eckhardt et al. |
| 10,734,674 B2 | 8/2020 | Meshcheryakov et al. |
| 12,224,611 B2 | 2/2025 | Cronin |
| 2005/0137764 A1 | 6/2005 | Alvarez-Troncoso et al. |
| 2006/0250902 A1 | 11/2006 | Bender et al. |
| 2007/0258188 A1 | 11/2007 | Shiue et al. |
| 2008/0161070 A1 | 7/2008 | Lee et al. |
| 2010/0315046 A1 | 12/2010 | Trainor et al. |
| 2011/0060565 A1 | 3/2011 | Sciarretta et al. |
| 2012/0025614 A1 | 2/2012 | Taimela et al. |
| 2012/0098496 A1 | 4/2012 | Jeong et al. |
| 2012/0109408 A1* | 5/2012 | Siy .................. B60L 1/02 701/1 |
| 2012/0248870 A1 | 10/2012 | Coleman et al. |
| 2012/0326668 A1 | 12/2012 | Ballantine et al. |
| 2013/0264875 A1 | 10/2013 | Kaminsky et al. |
| 2013/0271091 A1 | 10/2013 | Borkar |
| 2013/0307489 A1 | 11/2013 | Kusch et al. |
| 2013/0311529 A1 | 11/2013 | Liu et al. |
| 2014/0266059 A1 | 9/2014 | Li et al. |
| 2015/0042157 A1 | 2/2015 | Chen et al. |
| 2015/0047844 A1 | 2/2015 | McMillon et al. |
| 2015/0210173 A1 | 7/2015 | Funabashi |
| 2015/0303726 A1 | 10/2015 | Lei |
| 2016/0156005 A1 | 6/2016 | Elliot et al. |
| 2016/0176298 A1 | 6/2016 | Watson et al. |
| 2016/0283842 A1 | 9/2016 | Pescianschi |
| 2017/0076116 A1 | 3/2017 | Chen et al. |
| 2017/0203850 A1 | 7/2017 | Wang et al. |
| 2017/0267105 A1 | 9/2017 | Fratelli et al. |
| 2017/0373513 A1 | 12/2017 | Aronov et al. |
| 2018/0012197 A1 | 1/2018 | Ricci et al. |
| 2018/0050602 A1 | 2/2018 | Aronov |
| 2018/0154779 A1 | 6/2018 | Chol et al. |
| 2018/0201142 A1 | 7/2018 | Galin et al. |
| 2018/0326861 A1 | 11/2018 | Poirier |
| 2019/0061541 A1 | 2/2019 | Penilla et al. |
| 2019/0097362 A1 | 3/2019 | Haba et al. |
| 2019/0180949 A1 | 6/2019 | Liu et al. |
| 2020/0039356 A1 | 2/2020 | Montione |
| 2020/0039454 A1 | 2/2020 | Hsieh et al. |
| 2020/0164763 A1 | 5/2020 | Holme |
| 2020/0271725 A1 | 8/2020 | Herring et al. |
| 2020/0365336 A1 | 11/2020 | Luo et al. |
| 2020/0398696 A1 | 12/2020 | Stafl |
| 2021/0126509 A1 | 4/2021 | Macaluso |
| 2021/0175025 A1 | 6/2021 | Zhou et al. |
| 2021/0203177 A1 | 7/2021 | Peng |
| 2021/0221247 A1 | 7/2021 | Daniel et al. |
| 2021/0291964 A1* | 9/2021 | Gilbert .................. B64C 25/24 |
| 2021/0319152 A1 | 10/2021 | Couture et al. |
| 2021/0349155 A1 | 11/2021 | Srinivasan et al. |
| 2021/0376614 A1 | 12/2021 | Yang et al. |
| 2023/0187954 A1 | 6/2023 | Cronin |
| 2023/0211674 A1 | 7/2023 | Cronin |
| 2023/0211675 A1 | 7/2023 | Cronin |
| 2023/0211676 A1 | 7/2023 | Cronin |
| 2023/0211677 A1 | 7/2023 | Cronin |
| 2023/0211691 A1 | 7/2023 | Cronin |
| 2023/0213593 A1 | 7/2023 | Cronin |
| 2023/0216323 A1 | 7/2023 | Cronin |
| 2023/0216330 A1 | 7/2023 | Cronin |
| 2023/0216331 A1 | 7/2023 | Cronin |
| 2023/0234472 A1 | 7/2023 | Cronin |
| 2023/0241984 A1 | 8/2023 | Cronin |
| 2023/0378752 A1* | 11/2023 | Chen .................. H02J 1/122 |

FOREIGN PATENT DOCUMENTS

| | | |
|---|---|---|
| CN | 106252096 | 12/2016 |
| CN | 106252099 | 12/2016 |
| CN | 207453897 | 6/2018 |
| CN | 111216568 | 6/2020 |
| CN | 111490595 | 8/2020 |
| CN | 112290622 | 1/2021 |
| CN | 109983419 | 7/2022 |
| EP | 2 278 677 | 1/2011 |
| IN | 202041011809 A | 3/2020 |
| KR | 102247165 | 4/2021 |
| WO | WO 2014/107151 | 7/2014 |
| WO | WO 2018/041095 | 3/2018 |
| WO | WO 2018/106799 | 6/2018 |
| WO | 2020251854 A1 | 12/2020 |
| WO | WO 2023/114276 | 6/2023 |
| WO | WO 2023/114429 | 6/2023 |
| WO | 2023129520 A1 | 7/2023 |
| WO | 2023129521 A2 | 7/2023 |
| WO | 2023129522 A1 | 7/2023 |
| WO | 2023129614 A1 | 7/2023 |
| WO | 2023129616 A1 | 7/2023 |
| WO | 2023129695 A1 | 7/2023 |
| WO | 2023129718 A1 | 7/2023 |
| WO | 2023129724 A1 | 7/2023 |
| WO | 2023129741 A1 | 7/2023 |
| WO | WO 2023/129507 | 7/2023 |
| WO | WO 2023/150226 | 8/2023 |

OTHER PUBLICATIONS

International PCT Application No. PCT/US22/54026 International Search Report mailed Apr. 18, 2023 (7 pages).
International PCT Application No. PCT/US22/54184 International Search Report mailed Apr. 18, 2023 (7 pages).
International PCT Application No. PCT/US22/54029 International Search Report mailed Apr. 18, 2023 (6 pages).
International PCT Application No. PCT/US22/54030 International Search Report mailed May 30, 2023 (10 pages).
International PCT Application No. PCT/US22/54357 International Search Report mailed Apr. 5, 2023 (21 pages).
International PCT Application No. PCT/US22/54388 International Search Report mailed Apr. 5, 2023 (19 pages).
International Application No. PCT/US22/54186 International Search Report mailed Mar. 20, 2023 (11 pages).
International Application No. PCT/US22/54320 International Search Report mailed Apr. 7, 2023 (9 pages).
International Application No. PCT/US22/54348 International Search Report mailed Apr. 7, 2023 (9 pages).
International Application No. PCT/US23/12215 International Search Report mailed May 9, 2023 (6 pages).
Machine Translation CN103192724 reference of record (Year: 2020).
Machine Translation CN111216568 reference of record (Year: 2020).
PCT Application No. PCT/US22/52805, International Search Report and Written Opinion dated Apr. 13, 2023.
PCT Application No. PCT/US22/53955, International Search Report and Written Opinion dated Apr. 12, 2023.
U.S. Appl. No. 18/081,043, Office Action dated Mar. 13, 2024.
U.S. Appl. No. 18/081,043, John Cronin, Supercapacitor to Electrochemical Hybrid System, filed Dec. 14, 2022.
PCT/US22/52805, Supercapacitor to Electrochemical Hybrid System, Dec. 14, 2022.
PCT/US22/53060, Intelligent Hybrid Power System for Electrical Vehicles, Dec. 15, 2022.

(56) References Cited

OTHER PUBLICATIONS

U.S. Appl. No. 18/088,256, John Cronin, Supercapacitor to Electrochemical Hybrid System, filed Dec. 23, 2022.
PCT/US22/53955, Supercapacitor to Electrochemical Hybrid System, Dec. 23, 2022.
U.S. Appl. No. 18/088,663, John Cronin, Supercapacitor to Electrochemical Hybrid Top-Off System, filed Dec. 26, 2022.
PCT/US22/54026, Supercapacitor to Electrochemical Hybrid Top-Off System, Dec. 26, 2022.
U.S. Appl. No. 18/090,292, John Cronin, Supercapacitor to Electrochemical Hybrid System With Smart Self-Discharge Capability, filed Dec. 28, 2022.
PCT/US22/54184, Supercapacitor to Electrochemical Hybrid System With Smart Self-Discharge Capability, Dec. 28, 2022.
U.S. Appl. No. 18/088,679, John Cronin, Supercapacitor to Electrochemical Hybrid System With Smart Self-Discharge Capability, filed Dec. 26, 2022.
PCT/US22/54029, Supercapacitor to Electrochemical Hybrid System With Smart Self-Discharge, Dec. 26, 2022.
U.S. Appl. No. 18/088,680, John Cronin, Supercapacitor to Electrochemical Hybrid System With Failsafe Safety Capability, filed Dec. 26, 2022.
PCT/US22/54030, Supercapacitor to Electrochemical Hybrid System With Failsafe Safety, Dec. 26, 2022.
U.S. Appl. No. 18/091,822, John Cronin, Supercapacitor to Electrochemical Hybrid System With Supercapacitor Testing Capability, filed Dec. 30, 2022.
PCT/US22/54357, Supercapacitor to Electrochemical Hybrid System With Supercapacitor Testing Capability, Dec. 30, 2022.
U.S. Appl. No. 18/092,060, John Cronin, Supercapacitor to Electrochemical Hybrid System With Electrochemical Battery Testing Capability, filed Dec. 30, 2022.
PCT/US22?54388, Supercapacitor to Electrochemical Hybrid System With Electrochemical Battery Testing Capability, Dec. 30, 2022.
U.S. Appl. No. 18/090,277, John Cronin, Supercapacitor to Electrochemical Hybrid System With Electrochemical Battery Management Capability, filed Dec. 28, 2022.
PCT/US22/54186, Supercapacitor to Electrochemical Hybrid System With Electrochemical Battery Management Capability, Dec. 28, 2022.
U.S. Appl. No. 18/091,521, John Cronin, Supercapacitor to Electrochemical Hybrid System With a Regenerative Charging Capability, filed Dec. 30, 2022.
PCT/US22/54320, Supercapacitor to Electrochemical Hybrid System With a Regenerative Charging Capability, Dec. 30, 2022.
U.S. Appl. No. 18/091,756, John Cronin, Supercapacitor and Lead-Acid Battery Hybrid Battery With Charging Capability, filed Dec. 30, 2022.
PCT/US22/54348, Supercapacitor and Lead-Acid Battery Hybrid Battery With Charging Capability, Dec. 30, 2022.
U.S. Appl. No. 18/105,108, John Cronin, Supercapacitor to Electrochemical Hybrid System With Dynamic Impedence Matching Capability, filed Feb. 2, 2023.
PCT/US23/12215, Supercapacitor to Electrochemical Hybrid System With Dynamic Impedence Matching Capability, Feb. 2, 2023.
"200-MHz 16×16 Video Crosspoint Switch IC," Analogue Dialogue, Apr. 1997, vol. 31, No. 2, 25 pages; https://www.analog.com/en/analog-dialogue/articles/200-mhz-16×16-video-crosspoint-switch-ic.html.
"8×8 Analog Crosspoint Switches Analog & Digital Crosspoint ICs," Mouser Electronics, [Downloaded on Internet: Feb. 21, 2023], 5 pages, https://www.mouser.com/c/semiconductors/communication-networking-ics/analog-digital-crosspoint-ics.
Camara et al., "Polynomial Control Method of DC/DC Converters for DC-Bus Voltage and Currents Management-Battery and Supercapacitors," IEEE Transaction on Power Electronics, vol. 27, No. 3 (Mar. 2012): 1455-1467, DOI: 10.1109/TPEL.2011.2164581.
Crossbar Switch—Wikipedia, [Downloaded from Internet: Feb. 21, 2023], 7 pages; https://en.wikipedia.org/wiki/Crossbar_switch.
Danila et al., Elena; "Dynamic Modelling of Supercapacitor Using Artificial Neural Network Technique," International Conference and Exposition on Electrical and Power Engineering, Oct. 2014, DOI: 10.1109/ICEPE.2014.6969988 and https://www.researchgate.net/publication/270888480_Dynamic_Modelling_of_Supercapacitor_Using_Artificial_Neural_Network_Technique.
"Details, datasheet, quote on part No. BQ24640RVAR—High Efficiency Synchronous Switch-Mode Battery Charge Controller for Super Capacitors," Texas Instruments, SLUSA44A—Mar. 2010—Revised Jul. 2015, 31 pages, https://www.digchip.com/datasheets/%203258066-bq24640rvar.html.
"Digital Crosspoint Switches," MicroSemi Corp. (Aliso Viego, CA), [Downloaded from Internet Feb. 21, 23], 2 pages, https://www.microsemi.com/product-directory/signal-integrity/3579-digital-crosspoint-switches.
Eddahech et al., Akram; "Modeling and adaptive control for supercapacitor in automotive applications based on artificial neural networks," Electric Power Systems Research, vol. 106 (Jan. 2014): 134-141, https://www.sciencedirect.com/science/article/abs/pii/S0378779613002265.
Ge et al., Yuru; "How to measure and report the capacity of electrochemical double layers, supercapacitors, and their electrode materials," Journal of Solid State Electrochemistry, vol. 24 (2020): 3215-3230, https://link.springer.com/article/10.1007/s10008-020-04804-x.
Haddoun, Abdelhakim; "Modeling, Analysis, and Neural Network Control of an EV Electrical Differential," IEEE Transactions on Industrial Electronics, vol. 55, No. 6 (Jun. 2008): 2286-94, https://www.researchgate.net/publication/3219993.
Lin et al., Tianquan; "Nitrogen-doped mesoporous carbon of extraordinary capacitance for electrochemicalenergy storage," Science (new series), vol. 350, No. 6267 (Dec. 18, 2015): 1508-1513https://www.jstor.org/stable/24741499.
Marie-Francoise et al., Jean-Noel; "Supercapacitor modeling with Artificial Neural Network (ANN)," 2004, https://www.osti.gov/etdeweb/servlets/purl/20823689.
"Micrel™ 2.5V/3.3V 3.0 GHZ Dual 2×2 CML Crosspoint Switch w/ Internal Termination, SuperLite™ SY55858U," Nov. 2005, 8 pages, http://ww1.microchip.com/downloads/en/DeviceDoc/sy55858u.pdf.
Surewaard et al., Erik; "A Comparison of Different Methods for Battery and Supercapacitor Modeling," SAE Transactions, Journal of Engines, vol. 112, Section 3 (2003): 1851-1859, https://www.jstor.org/stable/44741399.
"Testing Super-Capacitors, Part 1: CV, EIS, and Leakage Current," Apr. 16, 2015, 11 pages, https://www.gamry.com/assets/Uploads/Super-capacitors-part-1-rev-2.pdf.
"Testing Electrochemical Capacitors Part 2—Cyclic Charge Discharge and Stacks," Nov. 14, 2011, 11 pages; https://www.gamry.com/assets/Application-Notes/Testing-Super-Capacitors-Pt2.pdf.
"Understanding Tree and Crosspoint Matrix Architectures." Pickering Test, [Downloaded from Internet: Feb. 21, 2023], 7 pages, https://www.pickeringtest.com/en-US/kb/hardware-topics/switching-architectures/understanding-tree-and-crosspoint-matrix-architectures.
PCT Application No. PCT/US22/52805, International Preliminary Report on Patentability dated Jun. 27, 2024.
PCT Application No. PCT/US22/53060, International Preliminary Report on Patentability dated Jun. 27, 2024.
PCT Application No. PCT/US22/53955, International Preliminary Report on Patentability dated Jul. 11, 2024.
PCT Application No. PCT/US22/54026, International Preliminary Report on Patentability dated Jul. 11, 2024.
PCT Application No. PCT/US22/54184, International Preliminary Report on Patentability dated Jul. 11, 2024.
PCT Application No. PCT/US22/54029, International Preliminary Report on Patentability dated Jul. 11, 2024.
PCT Application No. PCT/US22/54030, International Preliminary Report on Patentability dated Jul. 11, 2024.
PCT Application No. PCT/US22/54357, International Preliminary Report on Patentability dated Jul. 11, 2024.
PCT Application No. PCT/US22/54388, International Preliminary Report on Patentability dated Jul. 11, 2024.

(56) References Cited

OTHER PUBLICATIONS

PCT Application No. PCT/US22/54186, International Preliminary Report on Patentability dated Jul. 11, 2024.
PCT Application No. PCT/US22/54320, International Preliminary Report on Patentability dated Jul. 11, 2024.
PCT Application No. PCT/US22/54348, International Preliminary Report on Patentability dated Jul. 11, 2024.
PCT Application No. PCT/US23/12215, International Preliminary Report on Patentability dated Aug. 15, 2024.
Mesbachi et al., "Advanced Model of Hybrid Energy Storage System Integrating Lithium-Ion Battery and Supercapacitator for Electric Vehicle Applications, " IEEE Transactions on Industrial Electronics, vol. 68(5): 3962-3972, May 2021.
U.S. Appl. No. 18/090,277, Office Action dated Feb. 28, 2025.

\* cited by examiner

FIG. 4

INTELLIGENT HYBRID POWER SYSTEM FOR ELECTRICAL VEHICLES

CROSS-REFERENCE TO RELATED APPLICATIONS

This application claims the benefit of U.S. Provisional Application No. 63/290,703, filed Dec. 17, 2021, for "SUPERCAPACITOR TO ELECTROCHEMICAL HYBRID SYSTEM WITH INTELLIGENT SYSTEM," the disclosure of which is incorporated herein by reference in its entirety.

FIELD OF THE DISCLOSURE

The present disclosure relates generally to batteries and, more specifically, to an intelligent hybrid power system for an electrical vehicle.

BACKGROUND

The subject matter discussed in the background section should not be assumed to be prior art merely due to its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The number of electric vehicles (EVs) in operation has grown exponentially in recent years. Conventionally, EVs have relied on electrochemical batteries, e.g., lithium-ion and lead-acid batteries. However, electrochemical batteries suffer from a variety of disadvantages including a short shelf-life, low peak power, and a limited number of charging/discharging cycles.

More recently, supercapacitors have begun to replace lead-acid and lithium-based batteries in data storage applications requiring high current/short duration backup power. Supercapacitors are also finding use in a variety of high peak power and portable applications in need of high current bursts or momentary battery backup. Compared to batteries, supercapacitors provide higher peak power bursts in smaller form factors and feature longer charge cycle life over a wider operating temperature range.

There is a need to reduce the number of charging cycles of electrochemical batteries while providing greater electrical charge in electric vehicles. There is also a need optimize the charging of electrochemical batteries in an electric vehicle while enhancing the useful life of the electrochemical batteries.

SUMMARY OF THE DISCLOSURE

In one aspect, a system for powering an electric vehicle includes at least one electrochemical battery and at least one supercapacitor battery. The system also includes a first relay disposed on a first electrical path between the at least one electrochemical battery and the electric vehicle, the first relay to connect or disconnect the at least one electrochemical battery to or from the electric vehicle. The system further includes a second relay disposed on a second electrical path between the at least one supercapacitor battery and the electric vehicle, the second relay to connect or disconnect the at least one supercapacitor battery to or from the electric vehicle. In addition, the system includes a processor communicatively coupled to first and second relays, wherein the processor, responsive to a first condition, disconnects the at least one electrochemical battery from the electric vehicle via the first relay and connects the at least one supercapacitor battery to the electric vehicle via the second relay.

In one embodiment, the system further includes at least one current tester disposed on one or more of the first electrical path and/or the second electrical path, the at least one current tester to measure current flow between the at least one electrochemical battery or the least one supercapacitor battery, respectively, and the electrical vehicle.

In one embodiment, first condition comprises the current flow meeting or exceeding a threshold value. In another embodiment, the first condition comprises the current flow dropping below a threshold value.

In some embodiments, the system further includes a database to store real-time measurements of the current flow from the at least one current tester. The processor may calculate a current use pattern for one or both of the at least one electrochemical battery or the at least one supercapacitor battery based on the real-time measurements of current flow in the database.

In such an embodiment, the first condition may include one or more of a future load prediction based on the current use pattern and/or an amount of charge remaining in one or both of the at least one electrochemical battery or the at least one supercapacitor battery. The future load prediction may be obtained from machine learning according to historical current use patterns. In some embodiments, the future load prediction may be based on a user-defined or predicted route for the electric vehicle.

In one embodiment, the processor, responsive to second condition, disconnects the at least one supercapacitor battery from the electric vehicle via the second relay and reconnects the at least one electrochemical battery to the electric vehicle via the first relay.

According to another aspect, a method for powering an electric vehicle includes providing at least one electrochemical battery and at least one supercapacitor battery. The method also includes disposing a first relay on a first electrical path between the at least one electrochemical battery and the electric vehicle, the first relay to connect or disconnect the at least one electrochemical battery to or from the electric vehicle. The method further includes disposing a second relay on a second electrical path between the at least one supercapacitor battery and the electric vehicle, the second relay to connect or disconnect the at least one supercapacitor battery to or from the electric vehicle. In addition, the method includes controlling, responsive to a first condition, the first relay to disconnect the at least one electrochemical battery from the electric vehicle and the second relay to connect the at least one supercapacitor battery to the electric vehicle.

In one embodiment, the method further includes measuring, by at least one current tester disposed on one or more of the first electrical path and/or the second electrical path, current flow between the at least one electrochemical battery or the least one supercapacitor battery, respectively, and the electrical vehicle. The first condition may include the current flow meeting or exceeding a threshold value or the current flow dropping below a threshold value.

In some embodiments, the method further includes storing, in a database, real-time measurements of the current flow from the at least one current tester. The method may further include calculating a current use pattern for one or both of the at least one electrochemical battery or the at least one supercapacitor battery based on the real-time measurements of current flow in the database. In some embodiments, the first condition comprises one or more of a future load prediction based on the current use pattern and/or an amount of charge remaining in one or both of the at least one electrochemical battery and/or the at least one supercapacitor battery.

In some embodiments, the method further includes determining the future load prediction from machine learning according to historical current use patterns. The method may also include determining the future load prediction based on a user-defined or predicted route for the electric vehicle.

In one embodiment, the method also includes controlling, responsive to a second condition, the second relay to disconnect the at least one supercapacitor battery from the electric vehicle and the first relay to reconnect the at least one electrochemical battery to the electric vehicle.

BRIEF DESCRIPTION OF THE DRAWINGS

The accompanying drawings illustrate various embodiments of systems, methods, and other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another example and vice versa. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments. Those of skill in the art will recognize that alternate embodiments may be devised without departing from the claims' spirit or scope. Additionally, well-known elements of exemplary embodiments will not be described in detail or will be omitted so as not to obscure the relevant details of the disclosure.

As used herein, the word "exemplary" means serving as an example, instance, or illustration. The embodiments described herein are not limiting but rather are exemplary only. It should be understood that the described embodiments are not necessarily to be construed as preferred or advantageous over other embodiments. Moreover, the terms "embodiments of the invention," "embodiments," or "invention" do not require that all embodiments include the discussed features, advantages, or modes of operation.

Further, many of the embodiments herein are described in sequences of actions to be performed by, for example, elements of a computing device. It should be recognized by those skilled in the art that specific circuits can perform the various sequence of actions described herein (e.g., application-specific integrated circuits or "ASICs") and/or by program instructions executed by at least one processor. Additionally, the sequence of actions described herein can be embodied entirely within any form of computer-readable storage medium. The execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

For all ranges given herein, it should be understood that any lower limit may be combined with any upper limit when feasible. Thus, for example, citing a temperature range of from 5° C. to ° C. and from 20° C. to 200° C. would also inherently include a range of from 5° C. to 200° C. and a range of 20° C. to ° C.

When listing various aspects of the products, methods, or systems described herein, it should be understood that any feature, element, or limitation of one aspect, example, or claim may be combined with any other feature, element, or limitation of any other aspect when feasible (i.e., not contradictory). Thus, disclosing an example of a power pack comprising a temperature sensor and then a different example of a power pack associated with an accelerometer would inherently disclose a power pack comprising or associated with an accelerometer and a temperature sensor.

Unless otherwise indicated, components such as software modules or other modules may be combined into a single module or component or divided. The function involves the cooperation of two or more components or modules. Identifying an operation or feature as a single discrete entity should be understood to include division or combination such that the effect of the identified component is still achieved.

Some embodiments of this disclosure, illustrating its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used to practice or test embodiments, only some exemplary systems and methods are now described.

Figure 1:
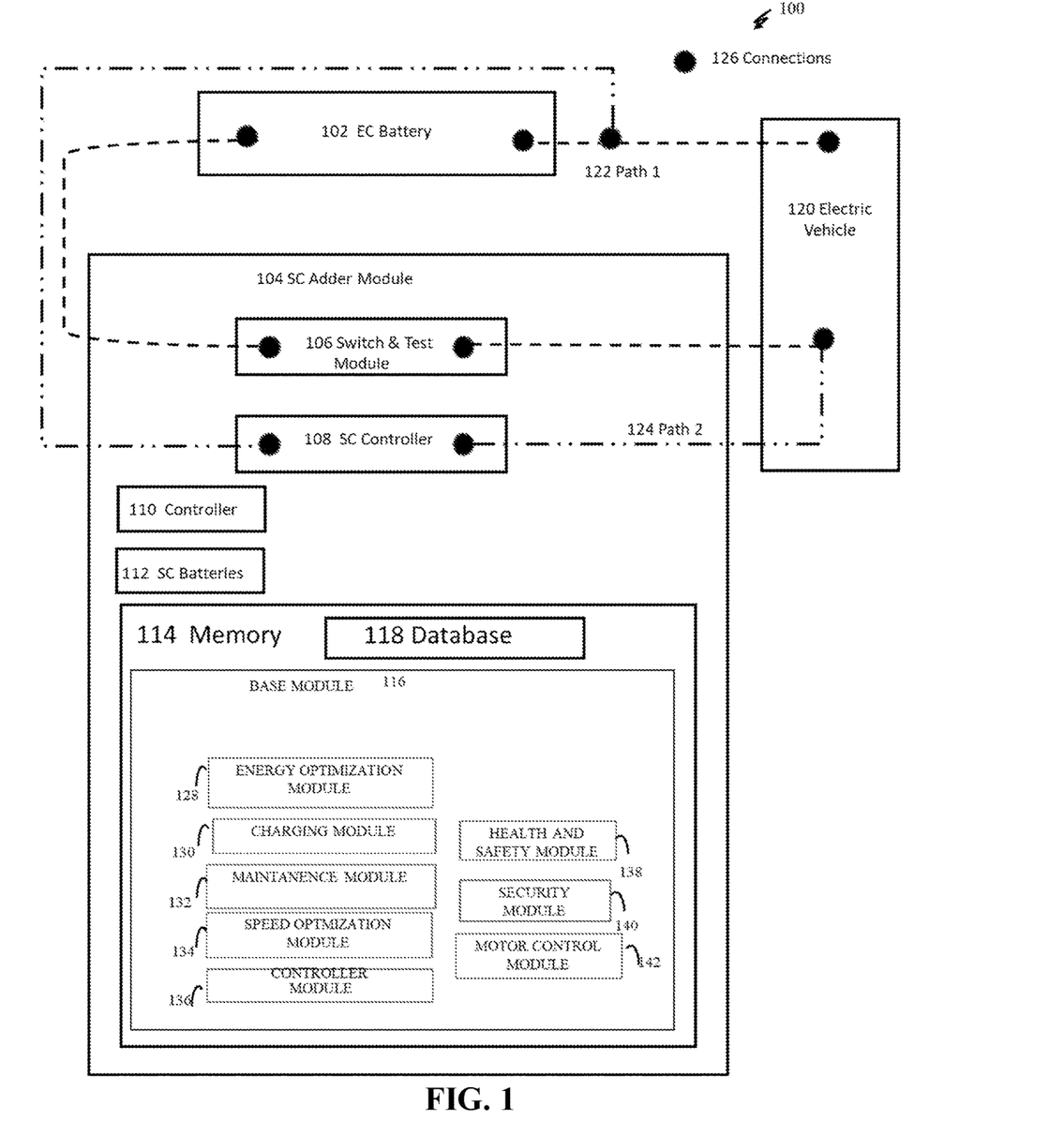
FIG. 1 is a schematic block diagram for an intelligent hybrid power system for an electric vehicle according to one embodiment.

FIG. 1 is a schematic block diagram of an intelligent hybrid power system 100 according to one embodiment. The system 100 may include an electrochemical (EC) battery 102, such as a lead-acid battery or a lithium-ion battery. While the disclosure often refers to a singular electrochemical battery 102, it should be understood that any such reference should be understood to include one or more electrochemical batteries 102. The electrochemical battery 102 may be an existing electrochemical battery 102 within an electric vehicle 120 or may be in addition to an existing electrochemical battery 102 or battery system.

The system 100 may further include a supercapacitor (SC) adder module 104, which may be embodied as a self-contained unit with various connections 126. Although four connections 126 are illustrated in FIG. 1, a person of skill in the art will recognize that more or fewer connections 126 may be provided. The supercapacitor adder module 104 may include one or more supercapacitor batteries 112. While the present disclosure often refers to the supercapacitor batteries 112 in the plural, it should be understood that any such reference should be understood to include one or more supercapacitor batteries 112.

As described in greater detail below, the supercapacitor adder module 104 may also include a control system to automatically switch between the electrochemical battery 102 and the supercapacitor batteries 112 (or vice versa) when powering the electric vehicle 120. In one embodiment, the supercapacitor adder module 104 including the supercapacitor batteries 112 has a higher capacity than a traditional electrochemical battery 102 and delivers a greater charge at a smaller weight and size. The supercapacitor batteries 112 may include any type or configuration of supercapacitor batteries or cells having enough capacity to enhance the integration of the supercapacitor adder module 104 and the electrochemical battery 102. The supercapacitor batteries 112 may be configured to have the same voltage as the electrochemical battery 102 so to easily integrate into the electric vehicle 120.

Principles for the design, manufacture, and operation of supercapacitors are described, by way of example, in U.S. Pub. No. 2019/0180949, titled "Supercapacitor," published Aug. 29, 2017; U.S. Pat. No. 9,318,271, titled "High-Temperature Supercapacitor," issued Apr. 19, 2016; U.S. Pub. No. 2020/0365336, titled "Energy Storage Device," published Nov. 19, 2020; U.S. Pat. No. 9,233,860, titled "Supercapacitor and Method for Making the Same," issued Jan. 12, 2016; and U.S. Pat. No. 9,053,870, titled "Supercapacitor with a Mesoporous Nanographene Electrode," issued Jun. 9, 2015, all of which are incorporated herein by reference.

The supercapacitor adder module 104 may be small enough to fit into an existing battery compartment of the electric vehicle 120. The electric vehicle 120 may be any type of electric vehicle, non-limiting examples of which may include automobiles, trucks, vans, fork lifts, carts (such as golf carts or baby carts), motorcycles, electric bikes scooters, autonomous vehicles, mobile robotic devices, hoverboards, monowheels, Segways®, wheelchairs, drones, personal aircraft, robotic devices, aquatic devices (such as boats, Jet Skis®, diver propulsion vehicles or underwater scooters), or the like.

The supercapacitor adder module 104 may be configured to easily connect to the electric vehicle 120 using standard battery connections 126 and may utilize circuitry including a first electrical path 122 and a second electrical path 124. The circuit layout of the first electrical path 122 and the second electrical path 124 is one example of how switching could occur, but there could be many others depending upon how the supercapacitor adder module 104 is designed. As illustrated in FIG. 1, the first electrical path 122 shows connections 126 between the electric vehicle 120 and electrochemical battery 102. The second electrical path 124 shows connections between electric vehicle 120 and supercapacitor controller 108, which, in turn, is electrically coupled to the supercapacitor batteries 112. The connections 126 may be terminals (such as found as battery terminals) to connect the supercapacitor adder module 104 into the system 100. One or more of the connections 126 may include or be associated with a digitally controlled, high-powered relay to connect or disconnect the electrochemical battery 102 and/or the supercapacitor batteries 112 to or from the electric vehicle 120 by completing or interrupting the first electrical path 122 or second electrical path 124, respectively. Suitable relays are available from TE Connectivity of Schaffhausen, Switzerland, among other suppliers.

There are many reasons to switch between the electrochemical battery 102 and supercapacitor batteries 112 (and vice versa) when powering the electric vehicle 120. For example, switching from the electrochemical battery 102 to the supercapacitor batteries 112 may allow the supercapacitor batteries 112 to run the electric vehicle 120 when higher amperage is desired quickly, such as when the electric vehicle 120 is moving up a steep hill or is predicted to move up the hill based on predefined or predicted route. In other examples, switching may be performed to optimize discharge, as the discharge is typically faster for the supercapacitor batteries 112 than the electrochemical battery 102.

In a further example, switching may be performed to enhance the long-term power storage of the electrochemical battery 102. For example, switching from the electrochemical battery 102 to the supercapacitor batteries 112 may be done to enhance the lifespan of the electrochemical battery 102, as the supercapacitor batteries 112 can be charged millions of times before they start to degrade, whereas the electrochemical battery 102 may only allow 500 to 1,000 charging cycles.

In some embodiments, a driving profile associated with the electric vehicle 120 may specify that supercapacitor batteries 112 are to be preferentially used to reduce charging cycles of the electrochemical battery 102 or otherwise reduce usage thereof extend the useful life of the electrochemical battery 102. The driving profile may be specified by a user in some embodiments via a user interface (not shown) integrated with the electric vehicle 120 and stored in a memory for later retrieval.

In one embodiment, the supercapacitor adder module 104 further includes a switch and test module 106. The switch and test module 106 may include a current tester which performs amperage measurement in the first electrical path 122 to determine how much amperage is drawn through the electrochemical battery 102 and the electric vehicle 120. As explained in greater detail below, the switch and test module 106 may also be instructed to disconnect or connect the electrochemical battery 102 using a digitally controlled, high-powered relay. The switch and test module 106 may operate in milliseconds, such that switching will not disrupt the smooth operation of the electric vehicle 120.

The supercapacitor adder module 104 may also include a supercapacitor controller 108 and a base module 116. As described in greater detail below, the base module 116 may execute a supercapacitor controller module 108 to switch between the electrochemical battery 102 and the supercapacitor batteries 112, allowing the supercapacitor controller 108 to disconnect the first electrical path 122 by instructing the switch and test module 106 to disconnect the first electrical path 122 and to switch the supercapacitor batteries 112 onto the second electrical path 124 using high-powered switching relays. The supercapacitor controller 108 also determines if the base module 116 executes the supercapacitor controller module 108 to switch between the supercapacitor batteries 112 and the electrochemical battery 102, in which case the supercapacitor controller 108 disconnects the second electrical path 124 and then instructs the switch and test module 106 to connect the first electrical path 122 allowing the electrochemical battery 102 onto the first electrical path 122 to power the electric vehicle 120.

The supercapacitor adder module 104 may further include a controller 110, which may be embodied as processor to execute instructions in a memory 114, allowing read/write access to a database 118 and performing instructions to activate or deactivate the switch and test module 106 and the supercapacitor controller 108. The controller 110 also enables current measurements from the first electrical path 122 and/or the second electrical path 124 to be collected and stored (in real-time) in the database 118. The controller 110 also controls the switching of the high-powered switching relay in the first electrical path 122 and the second electrical path 124 during execution of the base module 116.

The memory 114 may store the base module 116 and its sub-modules, as well as the database 118. Further, the base module 116 may read the database 118 and then execute the switch and test module 106. The switch and test module 106 can sense whether the electric vehicle 120 is connected and whether the electrochemical battery 102 is connected. The switch and test module 106 also reads the current (amperage) through the first electrical path 122 when the electric vehicle 120 is in operation. The database 118 allows for reading and writing data from the base module 116 and its sub-modules, as well as data associated with the switch and test module 106 and the supercapacitor controller 108.

The base module 116 controls the switch and test module 106 and measures amperage (current) flowing through both paths 122, 124. The base module 116 calculates an amperage use pattern from the database 118 and determines whether the amperage use pattern requires supercapacitor batteries. If so, the base module 116 controls the supercapacitor controller 108 to switch off the first electrical path 122 and turn on the second electrical path 124 connecting the supercapacitor batteries 112 through the supercapacitor controller 108 to the electric vehicle 120. The base module 116 also determines whether amperage use patterns require switching from supercapacitor battery 112 back to the electrochemical battery 102.

The base module 116 may include various sub-modules, including, without limitation, an energy optimization module 128, a charging module 130, a maintenance module 132, a speed optimization module 134, a control module 136, a health and safety module 138, a security module 140, and a motor control module 142. Each of the sub-modules may be configured with read/write access to the database 118. These modules will be described in greater detail below.

The energy optimization module 128 may optimize the electric charge of the plurality of supercapacitor batteries 112 and the electrochemical battery 102. The energy optimization module 128 may be able to read all data in the database 118. In one embodiment, the energy optimization module 128 may be configured to determine the percentage of electric charge available in each of the plurality of supercapacitor batteries 112 and electrochemical battery 102. The energy optimization module 128 may also be able to collect data related to each of the plurality of supercapacitor batteries 108 and electrochemical battery 102 required for one run time of the electric vehicle 120, as measured by an electric vehicle sensor (not shown). The energy optimization module 128 may rely on the supercapacitor batteries' 112 premeasure performance, such as the charge curve over time and the discharge curve over time at various loads. Once this premeasure performance is defined, it is stored in the database 118. The energy optimization module 128 may also rely on other curves, such as, without limitation, voltage vs. current charge and discharge curves, temperature as a discharge function under various loads, humidity versus storage time at a particular voltage, etc.

In some embodiments, the energy optimization module 128 may evaluate a future load prediction due to a user-defined or predicted route for the electric vehicle 120, where the energy optimization module 128 may determine that some batteries would be sufficient to satisfy the future load prediction, such that the energy optimization module 128 determinations may inform which batteries may be used for the planned trip. The energy optimization module 128, using premeasurements for the supercapacitor batteries 112 and electrochemical battery 102 may determine that, even though some of the batteries would be sufficient for the preplanned trip, some of the batteries are used, leaving the rest of the batteries with usable future charge in case there is a deviation from the planned trip.

The energy optimization module 128 may use preplanned route optimization or route optimization in many ways, including, but not limited to, applying artificial intelligence and/or machine learning (AI/ML) to historical data, i.e., historical data on actual use of a standard route, etc. The energy optimization module 128 may include an ML engine and/or an ML model that can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof.

The energy optimization module 128 may write all data, alerts, and calculations that may have been created to the database 118.

The charging module 130 determines whether charging is needed or not. For example, the charging module 130 may be configured to determine the charging and discharging status of the electrochemical battery 102 and/or the supercapacitor batteries 112 in real-time. The charging module 130 may be configured to charge the electrochemical battery 102 and/or the supercapacitor batteries 112 to meet a desired or predicted charge cycle. For example, in one embodiment, the desired charge cycle of each of the batteries 102, 112 may be two hours when each is charged up to a threshold limit of 90 percent.

The maintenance module 132 maintains the supercapacitor adder module 104 (including the supercapacitor batteries 112) and electrochemical battery 102. In one embodiment, the maintenance module 132 may be configured to run internal diagnostics of the supercapacitor adder module 104 and electrochemical battery 102 by accessing and testing the plurality of supercapacitor batteries 112 and the electrochemical battery 102. The maintenance module 132 may be run at specific periods on an internal clock (not shown) or could run if an alert is received from another module, such as receiving a notification from the charging module 130 that the charging is not working correctly. Further, the maintenance module 132 may determine whether the electric vehicle 120 is consuming electric charge at a higher rate than a desired or predicted rate for a particular run time, suggesting that a maintenance check may be needed.

In one embodiment, the maintenance module 132 may send a maintenance request to the base module 116, indicating that the plurality of supercapacitor batteries 112 and/or the electrochemical battery 102 is not coupled correctly. For example, the electric vehicle 120 may be experiencing more load while driving over the predefined path. Further, the maintenance module 132 may determine the performance of the supercapacitor adder module 104 and electrochemical battery 102 for retrieved performance from the database 118 (base on prestored design data). In another embodiment, the maintenance module 132 may perform an internal maintenance check to determine whether each component of the supercapacitor adder module 104 and electrochemical battery 102 is functioning up to its desired requirement. The maintenance module 132 may write all data, alerts, and calculations that may have been created to the database 118 for access by the base module 116 and other sub-modules.

The speed optimization module 134 may enhance the performance of the supercapacitor adder module and electrochemical battery 102 by minimizing the consumption of electric charge. In one embodiment, the speed optimization module 134 may be configured to determine that the electric vehicle is moving down an incline, such that the supercapacitor adder module 104 and the electrochemical battery 102 are not required to provide charge. In such a case, the speed optimization module 134 may stop the flow of the electric charge while the electric vehicle 120 is moving downward. The acceleration and orientation of the electric vehicle 120 may be measured by sensors (not shown). Further, the speed optimization module 134 may retrieve information related to maintenance of the electric vehicle 120 from the database 118 to measure the amount of electric charge consumed by the electric vehicle 120 before maintenance. The speed optimization module 134 may write all data, alerts, and calculations that may have been created to the database 118 for access by the base module 116 and other sub-modules.

The health and safety module 138 may be configured to provide health and safety-related information pertaining to the supercapacitor batteries 112 (danger of fire or explosion) as can be predicted by thermal sensors on the supercapacitor batteries 112 (not shown). The security module 140 may also evaluate and warn users how external charging hookups may be configured. Both the health and safety module 138 and the security module 140 may write all data, alerts, and calculations that may have been created to the database 118 for access by the base module 116 and other sub-modules.

The motor control module 142 may be configured to evaluate the performance of the supercapacitor adder module 104 and electrochemical battery 102 in at least two modes, e.g., an enhanced torque mode and an economy mode. The enhanced torque mode may be employed when the electric vehicle 120 moves up an incline (measured by amperage in the switch and test module 106 or by other sensors in the electric vehicle 120). For example, the motor of the electric vehicle 120 will consume a greater amount of electric charge (and greater amperage) to generate more torque for moving the electric vehicle upward. The economy mode may be initiated when the electric vehicle 120 moves down an incline. Less electric charge is needed to drive the electric vehicle downward or when the electric vehicle 120 is extending beyond the run time. In one embodiment, the motor control module 142 may be configured to monitor and anticipate the performance of the motor of the electric vehicle 120 according to the enhanced torque mode or the economy mode. Further, the motor control module 142 may retrieve data related to parameters affecting the movement of the electric vehicle 120 in the database 118 and write all data, alerts, calculations that may have been created to the database 118.

Figure 2:
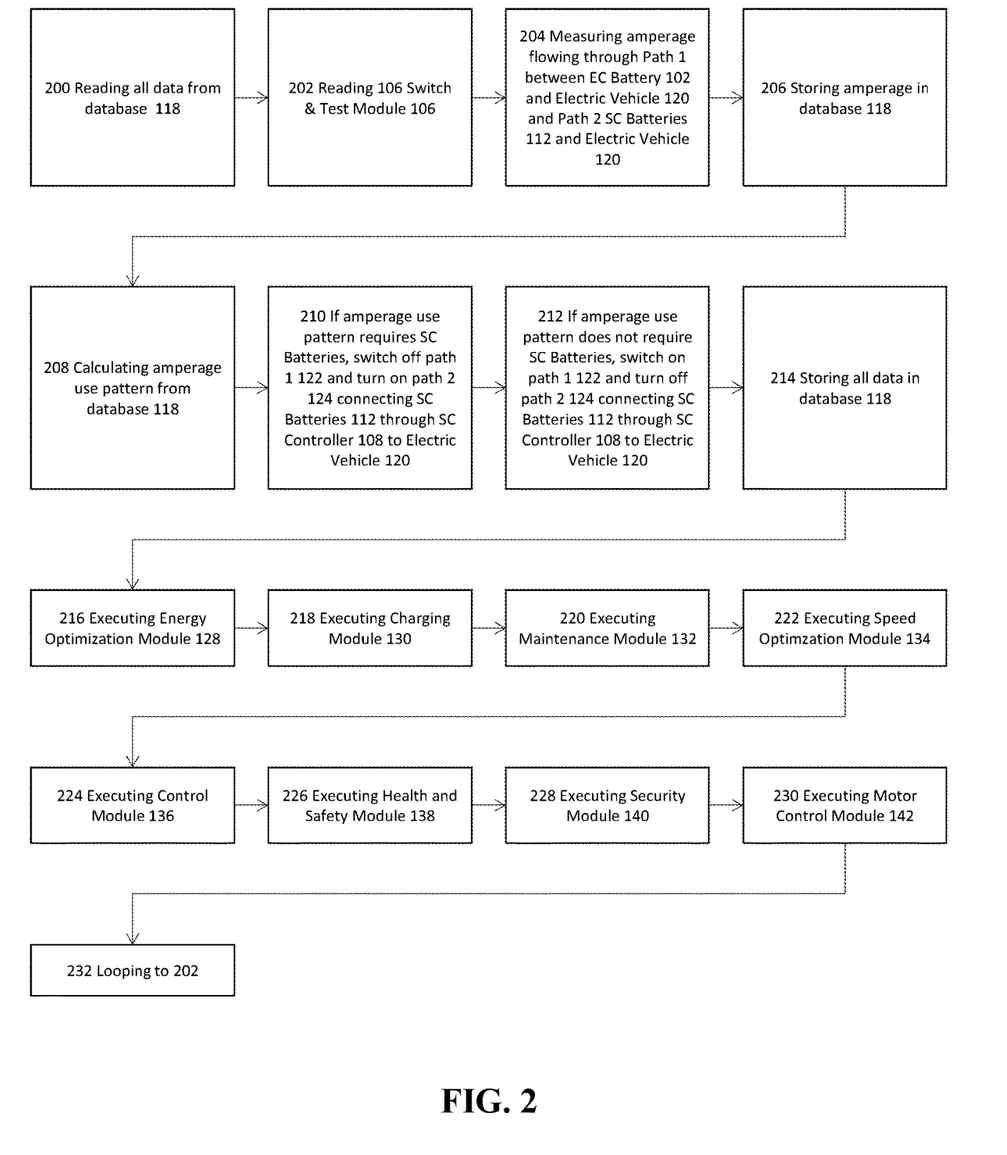
FIG. 2 is a flowchart of a method performed by a base module according to an embodiment.

FIG. 2 is a flowchart of a method performed by the base module 116 according to an embodiment of the disclosure. Those skilled in the art will appreciate that, for this and other processes and methods disclosed herein, the functions performed in the processes and methods may be implemented in a differing order. Furthermore, the outlined steps and operations are only provided as examples. Some of the steps and operations may be optional, combined into fewer steps and operations, or expanded into additional steps and operations without detracting from the essence of the disclosed embodiments.

The process begins with the base module 116 reading all data from the database 118 at step 200. The base module 116 then reads the switch and test module 106 at step 202 to determine if an electric vehicle 120 is connected and if the electrochemical battery 102 is connected. At step 204, the switch and test module 106, under control of the base module 116, measures the amperage passing through the first electrical path 122 (either inline or via a digital clamp meter) between the electrochemical battery 102 and the electric vehicle 120, as well as the amperage passing through the second electrical path 124 between the supercapacitor batteries 112 and the electric vehicle 120 when the electric vehicle 120 is running.

At step 206, the switch and test module 106 stores amperage data and associated time stamps in the database 118. The base module 116 then calculates, at step 208, an amperage use pattern from the database 118. The amperage use pattern for the electrochemical battery 102 may be the average amps used in one hour. In some embodiments, the amperage use pattern of the electrochemical battery 102 could be the amperage data over time and compared to a threshold or the amperage use pattern of an ideal or historical electrochemical battery previously stored in the database 118. For example, the base module 116 may determine whether the amperage meets or exceeds a predefined, dynamic, and/or user-defined threshold value—or drops below a threshold value—which may be used as a condition to determine whether to switch between the electrochemical battery 102 and supercapacitor batteries 112 (or vice versa).

The prestored historical amperage use pattern may provide metadata that can be read to instruct the base module 116 to switch between the electrochemical battery 102 and supercapacitor batteries 112. In some embodiments, a switching threshold and its metadata may be prestored in the database 118. If the amperage is used, for example, at or above the switching threshold, the metadata would instruct the base module to switch from the electrochemical battery 102 to the supercapacitor batteries 112.

At step 210, the base module 116 determines if the amperage use pattern requires supercapacitor batteries 112. If so, the base module 116 instructs the supercapacitor controller 108 to switch off the first electrical path 122 and turn on the second electrical path 124 connecting the supercapacitor batteries 112 through supercapacitor controller 108 to the electric vehicle 120. The base module 116 determines if amperage use patterns require an action to switch from electrochemical battery 102 to supercapacitor batteries 112 either by reading metadata from step 208 or by determining if amperage use data is beyond a preset threshold. It should be noted that the system 100 may be more intelligent by setting a threshold on amperage of supercapacitor batteries 112 to switch back to the electrochemical battery 102 if needed. It should be noted there may also be hybrid switching by switching on both supercapacitor batteries 112 and electrochemical battery 102.

At step 212, The base module 116 determines if the amperage use pattern does not require supercapacitor batteries 112. If the amperage use pattern does not require supercapacitor batteries 112, the base module 116 instructs the supercapacitor controller 108 to switch on the first electrical path 122 and turn off the second electrical path 124 that connects the supercapacitor batteries 112 through supercapacitor controller 108 to electric vehicle 120. The base module 116 then stores all data in database 118 at step 214.

In one embodiment, the base module 116 then executes the energy optimization module 128 at step 216. The base module 116 then executes charging module 130 at step 218. The base module 116 then executes maintenance module 132 at step 220. The base module 116 then executes the speed optimization module 134 at step 222. The base module 116 then executes the control module 136 at step 224. The base module 116 then executes the health and safety module 138 at step 226. The base module 116 then executes the security module 140 at step 228. The base module 116 then executes the motor control module 142 at step 230. At step 232, the base module 116 then loops to step 202.

Figure 3:
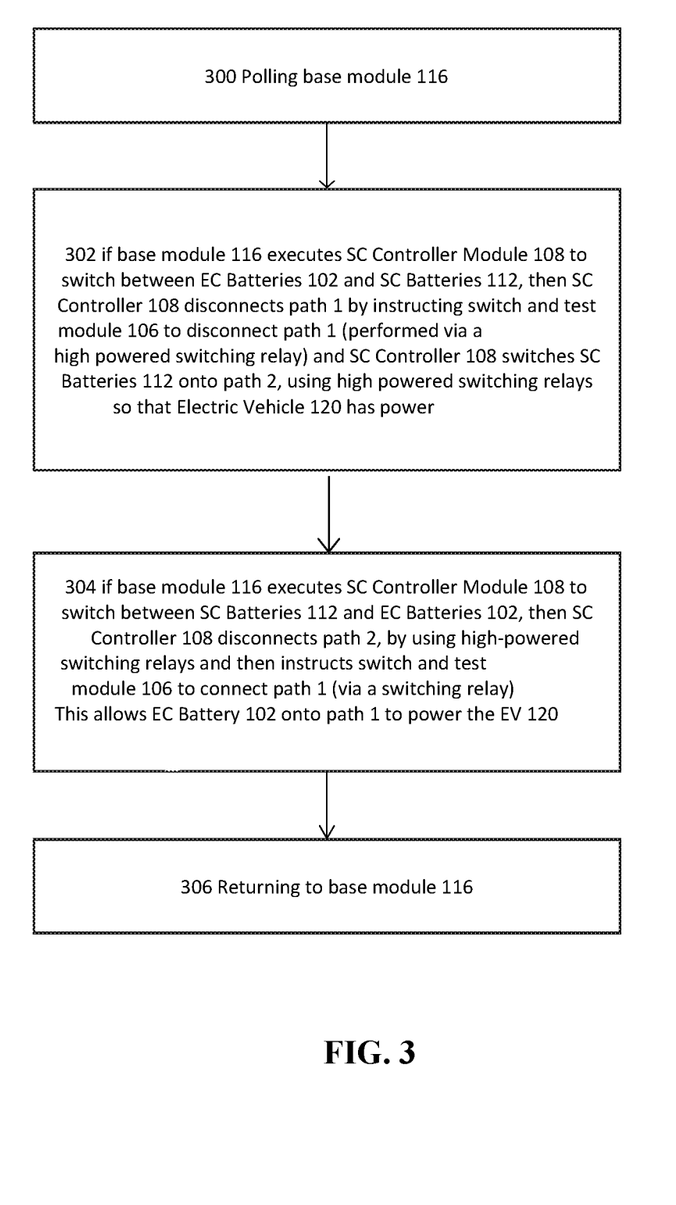
FIG. 3 is a flowchart of a method performed by a supercapacitor controller according to an embodiment.

FIG. 3 is a flowchart of a method performed by the supercapacitor controller 108 in an embodiment. Those skilled in the art will appreciate that, for this and other processes and methods disclosed herein, the functions performed in the processes and methods may be implemented in a differing order. Furthermore, the outlined steps and operations are only provided as examples. Some of the steps and operations may be optional, combined into fewer steps and operations, or expanded into additional steps and operations without detracting from the essence of the disclosed embodiments.

The process begins with the supercapacitor controller 108 polling the base module 116 at step 300. At step 302, if the supercapacitor controller 108 determines that the base module 116 executes the supercapacitor controller module 108 to switch between the electrochemical battery 102 and the supercapacitor batteries 112, then the supercapacitor controller 108 disconnects the first electrical path 122 by instructing the switch and test module 106 to disconnect the first electrical path 122 via the high-powered switching relay and the supercapacitor controller 108 switches the supercapacitor batteries 112 onto the second electrical path 124 using the high-powered switching relays so that the electric vehicle 120 is powered by the supercapacitor batteries 112.

At step 304, if the supercapacitor controller 108 determines that the base module 116 executes the supercapacitor controller module 108 to switch between the supercapacitor batteries 112 and the electrochemical battery 102, then supercapacitor controller 108 disconnects the second electrical path 124 using high-powered switching relays and then instructs the switch and test module 106 to connect the first electrical path 122 via the high-powered switching relay. This allows the electrochemical battery 102 onto the first electrical path 122 so that electric vehicle 120 is powered by the electrochemical battery 102. The supercapacitor controller module 108 then returns control to the base module 116 at step 306.

Figure 4:
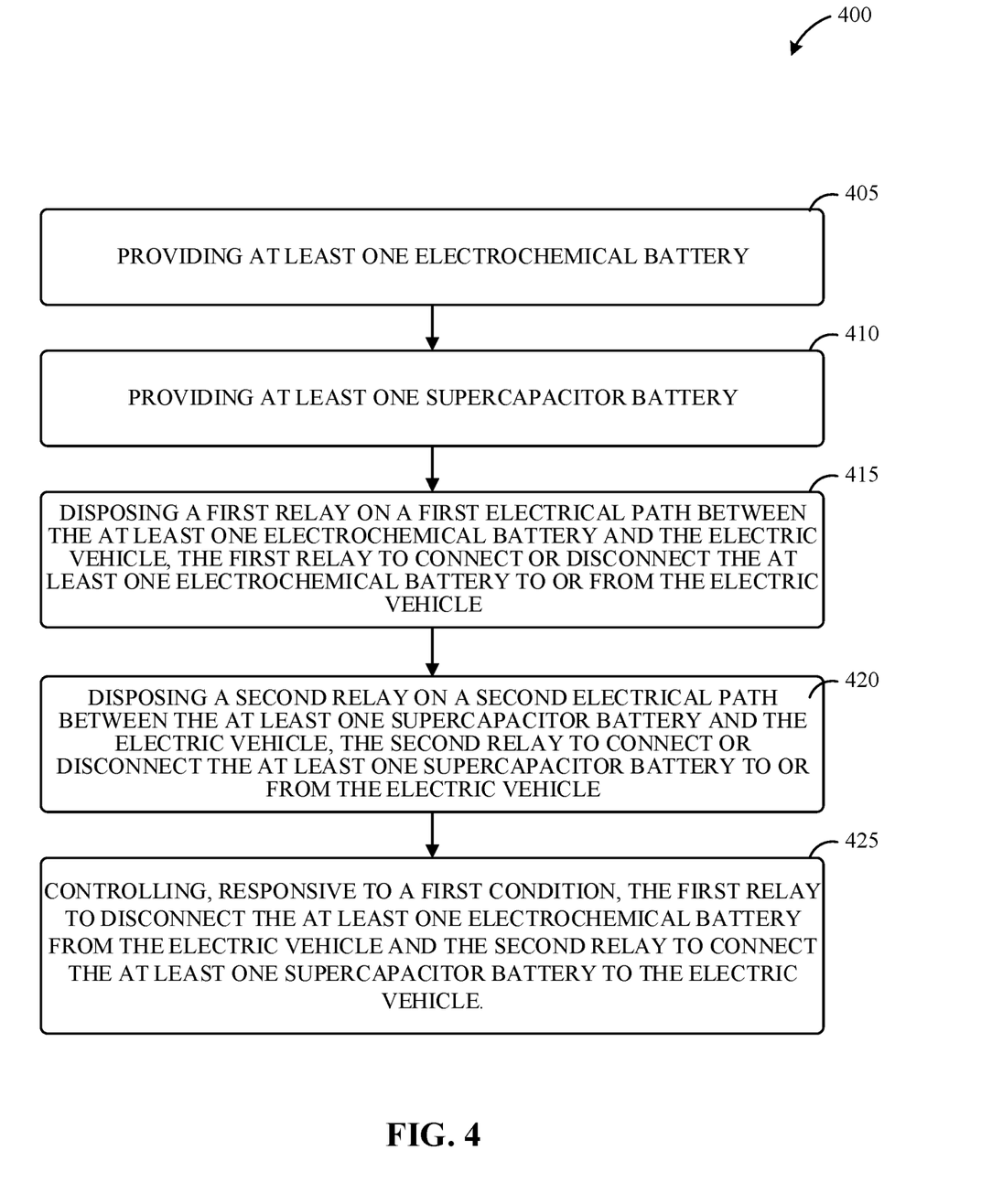
FIG. 4 is a flowchart of a method for powering an electric vehicle according to an embodiment.

FIG. 4 is a flowchart a method 400 for powering the electric vehicle 120 of FIG. 1 according to one embodiment of the present disclosure. At steps 405 and 410, the method 400 begins by providing at least one electrochemical battery 102 and at least one at least one supercapacitor battery 112. At step 415, the method 400 continues by disposing a first relay on a first electrical path 122 between the at least one electrochemical battery 102 and the electric vehicle 120, the first relay to connect or disconnect the at least one electrochemical battery 102 to or from the electric vehicle. At step 420, the method continues by disposing a second relay on a second electrical path 124 between the at least one supercapacitor battery 112 and the electric vehicle 120, the second relay to connect or disconnect the at least one supercapacitor battery 112 to or from the electric vehicle 120. At step 425, the method continues by controlling, responsive to a first condition, the first relay to disconnect the at least one electrochemical battery 102 from the electric vehicle 120 and the second relay to connect the at least one supercapacitor battery 112 to the electric vehicle 120.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMS), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A system for powering an electric vehicle, the system comprising:
 at least one electrochemical battery;
 at least one supercapacitor battery;
 a first relay disposed on a first electrical path between the at least one electrochemical battery and the electric vehicle, the first relay to connect or disconnect the at least one electrochemical battery to or from the electric vehicle;
 a second relay disposed on a second electrical path between the at least one supercapacitor battery and the electric vehicle, the second relay to connect or disconnect the at least one supercapacitor battery to or from the electric vehicle; and
 a processor communicatively coupled to first and second relays, wherein the processor, responsive to a first condition, disconnects the at least one electrochemical battery from the electric vehicle via the first relay and connects the at least one supercapacitor battery to the electric vehicle via the second relay, wherein the first condition comprises a future load prediction that is based on historical current use patterns, levels of steepness along a planned route to be driven by the electric vehicle, and an amount of charge remaining in at least one of the at least one electrochemical battery or the at least one supercapacitor battery.

2. The system of claim 1, further comprising at least one current tester disposed on one or more of the first electrical path or the second electrical path, the at least one current tester to measure current flow between the at least one electrochemical battery or the least one supercapacitor battery, respectively, and the electrical vehicle.

3. The system of claim 2, wherein the first condition comprises the current flow meeting or exceeding a threshold value.

4. The system of claim 2, wherein the first condition comprises the current flow dropping below a threshold value.

5. The system of claim 2, further comprising a database to store real-time measurements of the current flow from the at least one current tester.

6. The system of claim 5, wherein the processor calculates a current use pattern for one or both of the at least one electrochemical battery or the at least one supercapacitor battery based on the real-time measurements of current flow in the database.

7. The system of claim 1, wherein the future load prediction is obtained from machine learning according to the historical current use patterns.

8. The system of claim 7, wherein the future load prediction is based on a user-defined or predicted route for the electric vehicle.

9. The system of claim 1, wherein the processor, responsive to second condition, disconnects the at least one supercapacitor battery from the electric vehicle via the second relay and reconnects the at least one electrochemical battery to the electric vehicle via the first relay.

10. A method for powering an electric vehicle, the method comprising:
providing at least one electrochemical battery;
providing at least one supercapacitor battery;
disposing a first relay on a first electrical path between the at least one electrochemical battery and the electric vehicle, the first relay to connect or disconnect the at least one electrochemical battery to or from the electric vehicle;
disposing a second relay on a second electrical path between the at least one supercapacitor battery and the electric vehicle, the second relay to connect or disconnect the at least one supercapacitor battery to or from the electric vehicle; and
controlling, responsive to a first condition, the first relay to disconnect the at least one electrochemical battery from the electric vehicle and the second relay to connect the at least one supercapacitor battery to the electric vehicle, wherein the first condition comprises a future load prediction that is based on historical current use patterns, levels of steepness along a planned route to be driven by the electric vehicle, and an amount of charge remaining in at least one of the at least one electrochemical battery or the at least one supercapacitor battery.

11. The method of claim 10, further comprising measuring, by at least one current tester disposed on one or more of the first electrical path or the second electrical path, current flow between the at least one electrochemical battery or the least one supercapacitor battery, respectively, and the electrical vehicle.

12. The method of claim 11, wherein the first condition comprises the current flow meeting or exceeding a threshold value.

13. The method of claim 11, wherein the first condition comprises the current flow dropping below a threshold value.

14. The method of claim 11, further comprising storing, in a database, real-time measurements of the current flow from the at least one current tester.

15. The method of claim 14, further comprising calculating a current use pattern for one or both of the at least one electrochemical battery or the at least one supercapacitor battery based on the real-time measurements of current flow in the database.

16. The method of claim 10, further comprising determining the future load prediction from machine learning according to the historical current use patterns.

17. The method of claim 16, further comprising determining the future load prediction based on a user-defined or predicted route for the electric vehicle.

18. The method of claim 10, further comprising controlling, responsive to a second condition, the second relay to disconnect the at least one supercapacitor battery from the electric vehicle and the first relay to reconnect the at least one electrochemical battery to the electric vehicle.

* * * * *